UNITED STATES PATENT OFFICE.

GEORGE FREDERICK BRINDLEY, OF SAN FRANCISCO, CALIFORNIA, AND PETER McNIVEN BENNIE, OF NIAGARA FALLS, NEW YORK.

COMPOSITION OF MATTER FOR MANUFACTURING HYDROGEN GAS.

934,036.  Specification of Letters Patent.  Patented Sept. 14, 1909.

No Drawing.   Application filed April 10, 1908.  Serial No. 489,045.

*To all whom it may concern:*

Be it known that we, GEORGE FREDERICK BRINDLEY, a subject of the King of Great Britain, residing at San Francisco, in the county of Alameda and State of California, and PETER McNIVEN BENNIE, a citizen of the United States, residing at Niagara Falls, in the county of Niagara and State of New York, have invented a certain new and useful Improvement in Composition of Matter for Manufacturing Hydrogen Gas, of which the following is a full, clear, and exact description.

The present invention relates to a composition of matter for use in the manufacture of hydrogen gas.

The particular object of the invention is to produce a composition which may be readily made without danger and may be safely kept until ready for use, but which shall be in condition for immediate service at any time.

The composition in its broader aspect comprises a mixture of finely divided aluminum in the form of powder, filings or turnings, with caustic soda. Certain other materials as specified below may be used along with the aluminum in the mixture.

The preferable method of procedure in forming this composition is to pour molten caustic soda into a mass of aluminum in the form of powder, filings or turnings and thoroughly mixing the mass after which it is allowed to cool and broken up into pieces of suitable size which are stored in a water free receptacle. The molten caustic soda has little or no action upon the metallic aluminum in the absence of water and if the resultant mass be kept free from water until ready for use it will be effective for the purpose intended.

The quantities of caustic soda and aluminum may be in the relation of molecular equivalents or the caustic soda may be increased in proportion until it reaches an amount at which there are substantially three molecules of caustic soda for each one of aluminum. Proportions intervening between these two stated may be utilized, depending upon the rapidity with which it is desired that the composition shall act. When the material formed in the manner stated is placed in water a reaction takes place in which sodium aluminate is formed with the production of free hydrogen, this reaction occurring according to either of the following equations:

(1). $2Al + 2NaOH + xH_2O = Na_2Al_2O_4 + xH_2O + 3H_2$ (2). $2Al + 6NaOH + xH_2O = Na_6Al_2O_6 + xH_2O + 3H_2.$

If the composition contains aluminum and caustic soda in molecularly equivalent proportions, in accordance with the first equation, the generation of hydrogen is slow, but if sufficient water is used, the aluminum will be completely oxidized and the theoretical amount of hydrogen obtained. If, in the composition, the caustic soda and the aluminum bear the relation set forth in the second equation, the generation of hydrogen will be more rapid. The composition, therefore, is made up in accordance with equation (1) where it is not necessary to have particularly rapid generation of hydrogen, but is made in accordance with equation (2) where it is desired to obtain a rapid generation. As above stated, intermediate mixtures may be used according to circumstances.

It is sometimes desired in forming the composition to place the powdered aluminum in a small drum or cartridge of sheet iron and pour the molten caustic soda in upon it so as to effect the mixture in this receptacle. The drum or cartridge is then closed to protect it against the action of moisture until it is desired to use it.

The composition may be handled for the purpose of generating hydrogen gas after the manner in which calcium carbid is used for generating acetylene gas if this be desired, but it may be used in other obvious ways equally well.

We have further found that silicon or zinc or both when included in the mixture with the aluminum also go into solution giving off hydrogen gas, and we desire it to be understood that we include such additions within the scope of our invention.

In inclosing the mixture in a small drum or cartridge as above indicated, we find it desirable in some cases to make the container of aluminum so that the container itself will enter into the reaction. In such cases the proportion of finely divided aluminum in the mixture may be appreciably diminished.

Having thus described our invention, we claim:

1. A composition of matter comprising a mixture of finely divided aluminum and caustic soda, free from water.

2. A composition of matter comprising a mixture of finely divided aluminum and caustic soda, the proportion of the caustic soda being substantially between one to three molecules to one molecule of aluminum.

3. A composition of matter comprising a mixture of aluminum and molten caustic soda.

4. A composition of matter comprising a mixture of powdered aluminum and silicon with caustic soda.

5. A composition of matter comprising a mixture of powdered aluminum with silicon, zinc and caustic soda, free from water.

6. The method of making the composition herein described which comprises mixing aluminum and molten caustic soda in the absence of water.

7. The method of making the composition herein described which comprises mixing aluminum and molten caustic soda in the absence of water, the soda being in the proportions of substantially between one and three molecules to one molecule of aluminum.

8. The method of making the composition of matter herein described which comprises substantially mixing finely divided aluminum and finely divided silicon or zinc with molten caustic soda in the absence of water.

In testimony whereof, we hereunto affix our signatures in the presence of two witnesses.

GEORGE FREDERICK BRINDLEY.
PETER McNIVEN BENNIE

Witnesses:
 FRANCIS A. J. FITZGERALD,
 D. R. MILLER.